(No Model.)

I. HIGH.
REEL FOR FENCE WIRE.

No. 347,241. Patented Aug. 10, 1886.

Witnesses
T. W. Fowler
H. B. Applewhaite

Inventor
Isaac High
By his Attorneys
A. H. Evans & Co.

UNITED STATES PATENT OFFICE.

ISAAC HIGH, OF JANESVILLE, IOWA.

REEL FOR FENCE-WIRE.

SPECIFICATION forming part of Letters Patent No. 347,241, dated August 10, 1886.

Application filed June 9, 1886. Serial No. 204,592. (No model.)

*To all whom it may concern:*

Be it known that I, ISAAC HIGH, a citizen of the United States, residing at Janesville, in the county of Bremer and State of Iowa, have invented certain new and useful Improvements in Reels for Containing Wire, of which the following is a full, clear, and exact description, reference being had to the accompanying drawings, forming part of this specification, in which—

Figure 1:
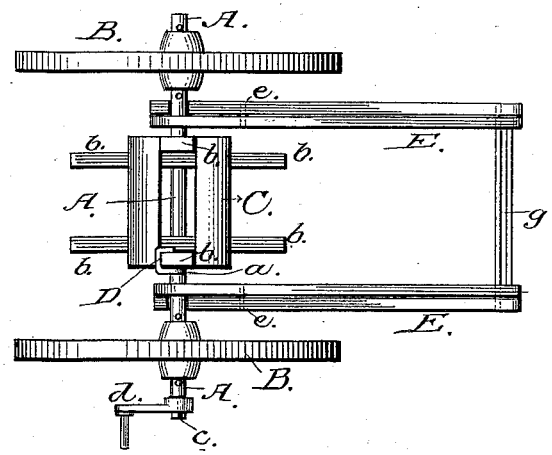
Figure 2:
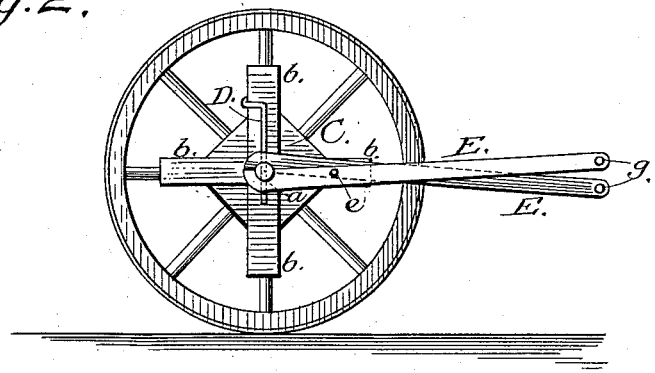
Figure 3:
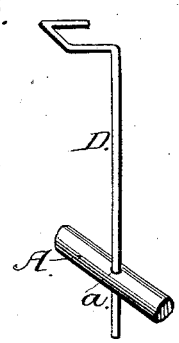

Figure 1 is a plan view of a reel embodying my improvements. Fig. 2 is a side elevation of the same with one of the supporting-wheels removed. Fig. 3 is a detail of the retaining-pin.

My invention relates to reels or spools for reeling and paying out fence or other wire; and it consists in the peculiar construction and combination of devices which I will hereinafter fully describe and claim.

To enable others skilled in the art to make and use my invention, I will proceed to describe the manner in which I have carried it out.

In the said drawings, A represents a suitable axle upon which the supporting-wheels B are loosely mounted. The spool C is of any well-known construction and is designed to rotate upon the axle, so as to provide for the free paying out or taking up of the wire. When it is desired to hold the spool from rotating, I pass through a perforation, *a*, in the axle A the straight arm of a retaining-pin, D, the upper end of said arm being bent in such manner that it clasps one of the arms, *b*, which form the ends of the spool. By this construction I am enabled to check the revolution of the spool and securely hold said spool in a locked position on the shaft until it is desired to again pay out or take up the wire.

One end of the axle A is extended, and is provided with a squared portion, *c*, adapted to receive a crank-handle, *d*, whereby the spool is rotated.

The velocity of the spool is controlled by a brake mechanism consisting of a double set of parallel levers, E, pivoted together at *e* in such manner that the short arms of said levers pass upon opposite sides of the axle and impinge tightly against the same when power is applied to the outer long arms of said levers. I am thus enabled to regulate the feed of the spool. At the same time the levers E, being connected together by cross rods or bars *g*, serve as means for drawing the reel from place to place.

From the foregoing description it is evident I provide a simple and durable device, in which neither bolts nor springs are employed, and one in which the full benefits of an effective reel is set forth.

Having thus described my invention, what I claim as new, and desire to secure by Letters Patent, is—

1. The combination, with the axle, the supporting-wheels mounted thereon, and the spool, of the levers E, pivoted together with their short arms engaging the axle, substantially as described.

2. The supporting-wheels B, the axle A, having a squared portion and a crank-handle engaging said portion, in combination with a spool mounted on the axle, and a locking-pin passing through a perforation in said axle, and engaging an arm on the spool, substantially as described.

3. An improved reel comprising a crank-axle, the supporting-wheels on the axle, a spool rotating upon said axle, a pin for holding the spool in a locked position, and a double series of pivoted levers engaging the axle to regulate the velocity of the spool and also serving as a means for transporting the reel, substantially as herein described.

ISAAC HIGH.

Witnesses:
O. J. FULLERTON,
FREDERIC JACOB.